W. D. Gridley.
Picture Hook.

No. 85,738.    Patented Jan. 12, 1869.

Witnesses:
E. M. Bliss
J. W. Bliss

Inventor,
Wilmer D. Gridley

United States Patent Office.

WILMER D. GRIDLEY, OF NEW BRITAIN, CONNECTICUT.

Letters Patent No. 85,738, dated January 12, 1869.

IMPROVEMENT IN PICTURE-HOOK.

The Schedule referred to in these Letters Patent and making part of the same.

*To all whom it may concern*.

Be it known that I, WILMER D. GRIDLEY, of New Britain, county of Hartford, and State of Connecticut, have invented certain new and useful Improvements in Picture-Hooks or Nails; and to enable others skilled in the art to make and use the same, I will proceed to describe, referring to the drawing, in which the same letters indicate like parts in each of the figures.

The nature of this invention consists in making the wall-plate of any desirable ornamental pattern, having a hook or knob made on or secured thereto, and an orifice of such form and shape that, when placed over a nail or screw-head in the wall, it will tighten its hold upon said nail or screw as the weight is brought to hang upon it, thus allowing the plate, with its hook or knob, to be removed and replaced at pleasure, without disturbing the nail or screw in the wall.

In the accompanying drawings—

Figure 1:
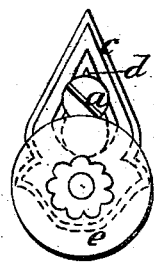
Figure 1 is a face view of this invention.
Figure 2:
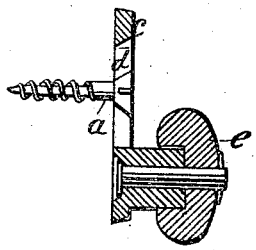
Figure 2 is a side sectional view.

$a$ is a nail or screw, driven or turned into the wall nearly up to its head, or so that its head projects about the thickness of the picture-hook or knob-plate.

$c$ is the hook or knob-plate, which I propose to make in various styles and patterns.

This plate $c$ is provided with a $\wedge$-shaped orifice, $d$. The widest portion of this orifice is placed over the head of the nail or screw $a$, and pulled down, which causes the $\wedge$-shaped opening $d$ to clasp the head, and is firmly held in place thereby, until it may be desirable to remove the plate, when it is only necessary to lift and remove in the same way in which it was first introduced to its place.

$e$ is a hook or knob, cast on or secured to the plate in the ordinary way.

Thus old-pattern hooks can be easily and quickly removed, and new and richer styles substituted in their places, without damage to the walls of the apartments.

I believe I have thus shown the nature, construction, and advantage of this invention, so as to enable others skilled in the art to make and use the same therefrom.

What I claim, therefore, and desire to secure by Letters Patent, is—

The plate $c$, having a $\wedge$-shaped orifice, $d$, with a knob, $e$, substantially as constructed, and for the purpose described.

WILMER D. GRIDLEY. [L. S.]

Witnesses:
 E. W. BLISS,
 J. W. BLISS.